C. L. MOUNTS.
WIRE ROPE CLAMP.
APPLICATION FILED FEB. 2, 1909.
944,141.
Patented Dec. 21, 1909.
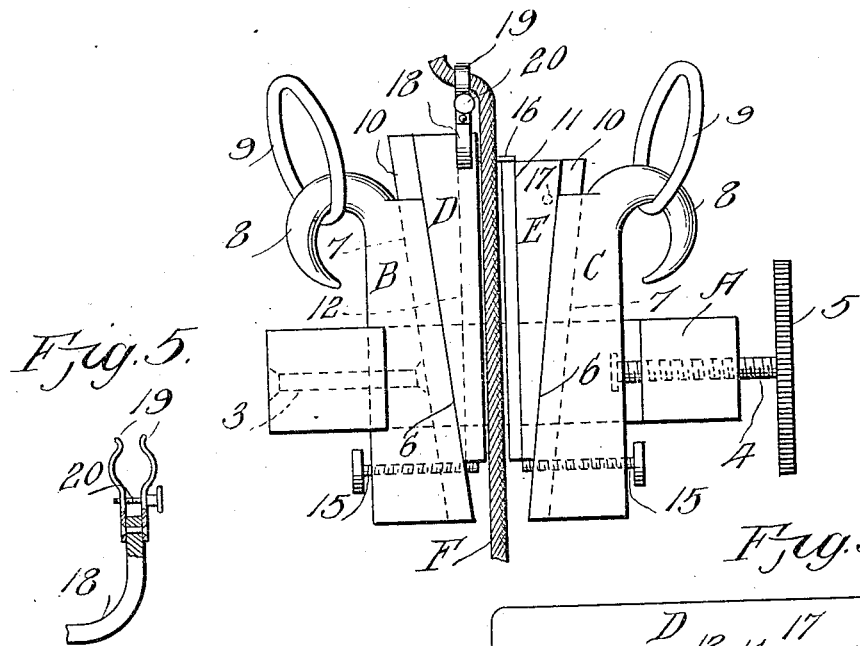
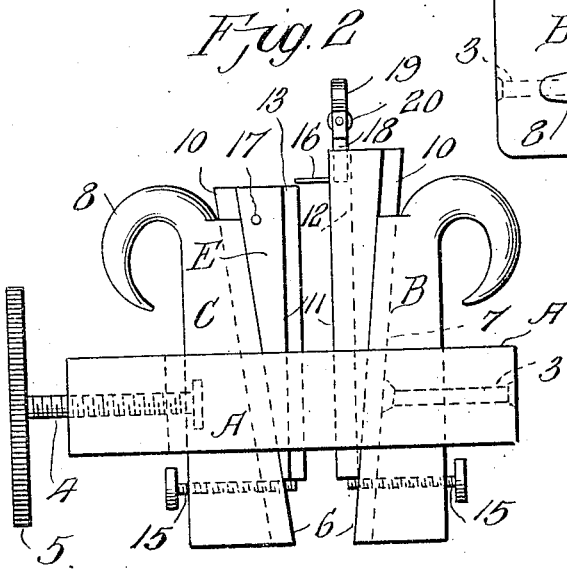
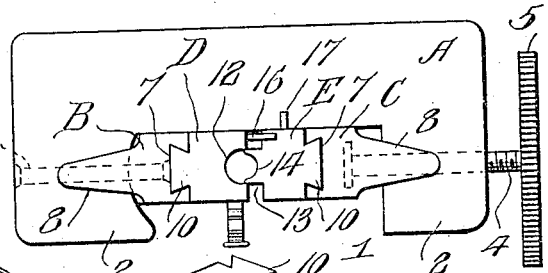
Inventor
Charles L. Mounts,
Witnesses
Frank Hough
F. C. Gibson.
By Victor J. Evans
Attorney

UNITED STATES PATENT OFFICE.

CHARLES L. MOUNTS, OF PARKERSBURG, WEST VIRGINIA.

WIRE-ROPE CLAMP.

944,141.  Specification of Letters Patent.  Patented Dec. 21, 1909.

Application filed February 2, 1909. Serial No. 475,678.

*To all whom it may concern:*

Be it known that I, CHARLES L. MOUNTS, a citizen of the United States, residing at Parkersburg, in the county of Wood and State of West Virginia, have invented new and useful Improvements in Wire-Rope Clamps, of which the following is a specification.

This invention relates to a clamping device for wire cables or ropes and is intended primarily for use in connection with wire cables employed in drilling oil or other wells, although it is to be understood that the device is not necessarily limited to this use.

The invention has for one of its objects to improve and simplify the construction and operation of clamping devices so as to be comparatively easy and inexpensive to manufacture, thoroughly reliable and effective in operation, and readily manipulated.

A further object of the invention is the provision of a clamping device having great gripping power and designed to prevent crystallization and breakage of the wire strands by kinking of the cable when slack, the parts being so designed that a cable can be readily inserted or removed and that the clamping pressure will be exerted more uniformly around the whole surface of the cable so as to prevent flattening of the latter.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a front elevation of the device showing the wedges thereof in unclamping position. Fig. 2 is a rear view thereof showing the cable removed and the suspending rings of the device detached. Fig. 3 is a plan view. Fig. 4 is a perspective view of one of the wedges or gripping members. Fig. 5 is a fragmentary view of the cable-supporting arm for preventing kinking of the cable when the latter is slack.

Similar reference characters are employed to designate corresponding parts throughout the several views.

Referring to the drawing, A designates the body of the device which is preferably, although not necessarily, a block of steel or other metal having a recess 1 in one of its long edges, thereby presenting forwardly-extending arms or abutments 2. Disposed vertically in the recess 1 are seats or guiding members B and C, the former of which is rigidly secured to the arm at the left, Fig. 1, by a rivet 3, while the latter member is adjustable back and forth in the recess 1 by a screw 4 threaded in the other arm 2 and suitably connected with the member C, there being a hand wheel 5 on the outer end of the screw for conveniently turning the same. The opposed surfaces 6 of the members B and C converge downwardly and have longitudinally-extending dove-tail grooves 7, as clearly shown in Fig. 3. Formed on the upper ends of the members B and C are hooks 8 for receiving rings 9 or equivalent devices of the chains or other elements for suspending the clamping device in operative position.

Guided on the members or seats B and C are wedges or gripping members D and E that are formed with dove tails 10 which fit in the grooves 7 so as to be slidably connected with the seats. The outer surfaces of the wedges are inclined to correspond with the bearing faces 6 of the members so that as the wedges are moved downwardly, they are brought together into gripping engagement with the cable or other object to be gripped. The meeting or oppositely-disposed faces 11 of the wedges extend vertically and in the wedge D is a longitudinal groove 12 which is approximately semi-circular in cross section, and on the other wedge is a longitudinal tongue 13 proportioned to enter the groove and itself having a groove 14 approximately semi-circular in cross section so that the said grooves form gripping surfaces which conform to the shape of the cable and effectively grip the latter approximately uniformly at all points and thus better distribute the pressure and prevent flattening of the cable. Extending transversely to and threaded in the lower ends of the members B and C are screws 15 which can be adjusted to project inwardly beyond the surfaces 6 and thus form stops on which the wedges are adapted to rest when unclamped from the cable F, as shown in Fig. 1. The wedge D is slightly longer than the other wedge and has a laterally-projecting finger or pin 16 that is adapted to engage the upper end of the member E so as to prevent the member D from slipping downwardly too far, and thereby maintaining the lower ends of the members or wedges even. On the wedge E is a rearwardly-projecting pin or finger 17 which, by engaging the body A, will prevent the member E from dropping vertically off the seat C and at the same time prevent the wedge D from dropping out because of the pin 16 extending over the upper end of the wedge E. Secured to the wedge D is a forwardly and upwardly curved arm 18 that is provided with clamping jaws 19 which can be set by a screw 20, the jaws serving to receive the cable when the latter is slack as shown in Fig. 1, and thereby prevent the cable from bending or kinking over the sharp edge of the wedge D.

In gripping a cable in the device, the wedges are held separated as shown in Fig. 2, by resting them on the inner ends of the screws 15 and if more clearance is desired, the screw 4 can be manipulated for moving the member C outwardly to thereby permit the cable to be inserted between the wedges. After the cable is placed in the groove 12, the screw 4 is actuated to cause the tongue 13 to enter the groove 12 and finally grip the cable. Next the screws are turned to move outwardly from under the wedges so that the latter will be drawn downwardly as tension is placed on the cable and thus the wedges are moved toward each other for firmly holding the cable against slipping. The manipulation of the various parts can be effectively accomplished and the arrangement and design of the parts are such that a very powerful gripping effect can be produced.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. A clamping device of the character described, comprising relatively adjustable spaced guides, supporting means for the same, wedges slidable upon the guides and movable toward and away from each other, a finger upon one of the wedges extending toward and adapted to engage the opposite wedge, and a finger upon the latter wedge extending above and adapted to engage the guide member supporting said wedge.

2. In a clamping device of the character described, a pair of relatively adjustable guides, supporting means for the same, wedge members slidably engaging the guides, set screws engaging the guides and adjustable in the path of the lower ends of the wedges, a stop member upon one of the wedges to engage the opposite wedge, a stop member upon the latter wedge to engage the guide member supporting the said wedge, and a clamp connected with and extending laterally and upwardly from the first-named wedge.

In testimony whereof I affix my signature in presence of two witnesses.

CHARLES L. MOUNTS.

Witnesses:
 IRENE KELLY,
 R. E. KERR.